Nov. 1, 1932.                W. ROBERTS                1,885,857
                        MULTIPLE SPEED TRANSMISSION
                          Filed May 31, 1930              2 Sheets-Sheet 1
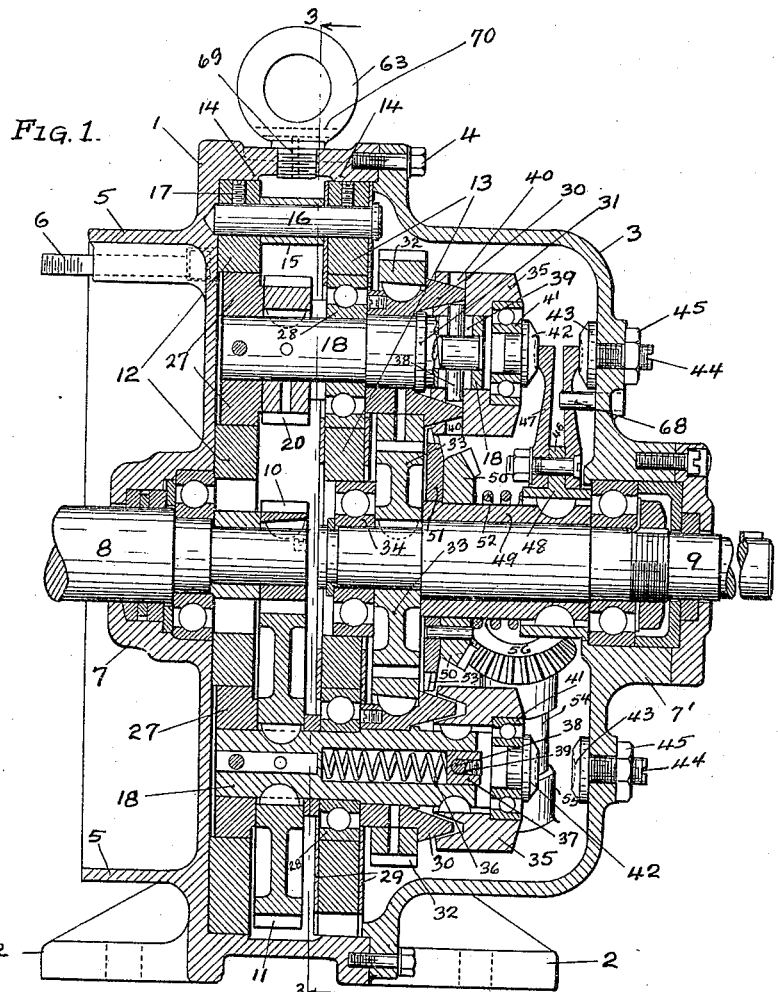
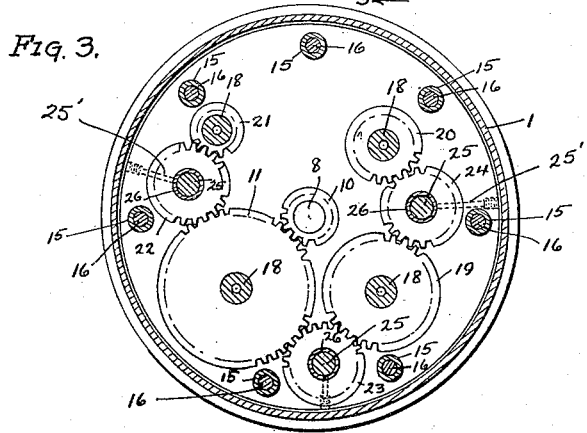
INVENTOR.
WILLIAM ROBERTS
BY *Miller Boykin & Bried*
ATTORNEYS.

Nov. 1, 1932.                W. ROBERTS                1,885,857
                      MULTIPLE SPEED TRANSMISSION
                         Filed May 31, 1930              2 Sheets-Sheet 2
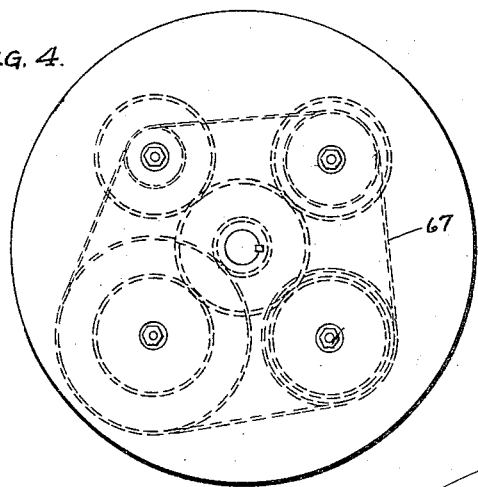
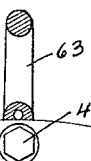
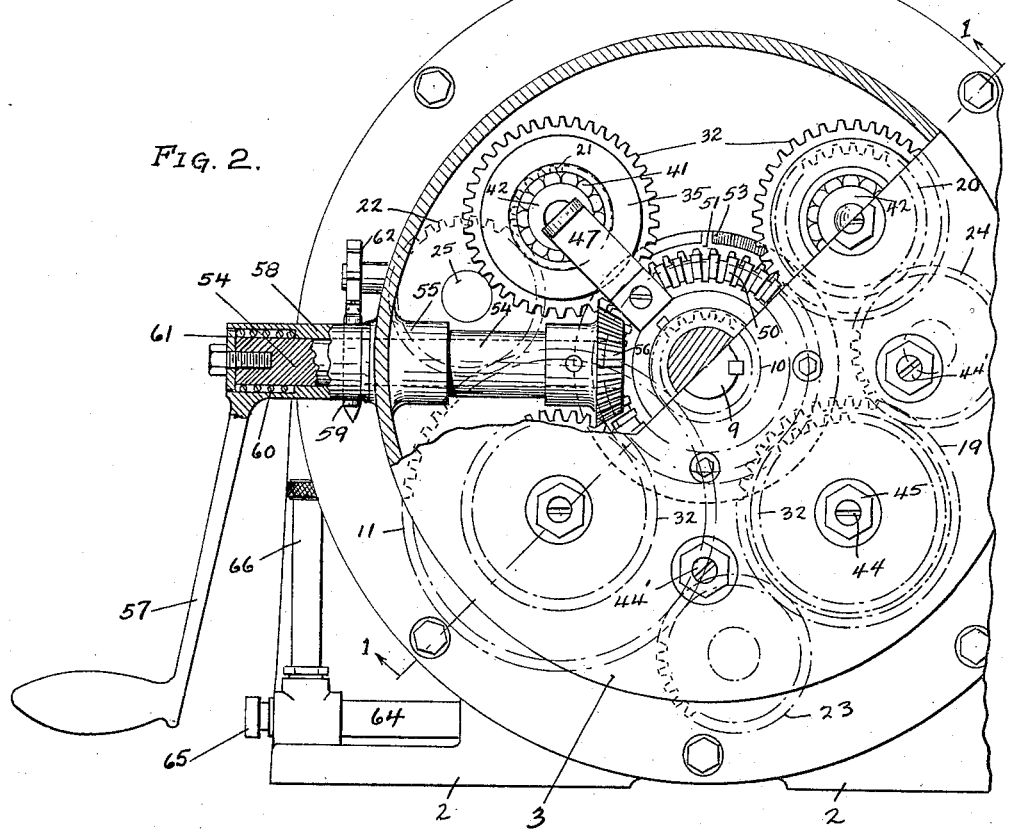
INVENTOR.
WILLIAM ROBERTS
ATTORNEYS.

Patented Nov. 1, 1932

1,885,857

UNITED STATES PATENT OFFICE

WILLIAM ROBERTS, OF OAKLAND, CALIFORNIA

MULTIPLE SPEED TRANSMISSION

Application filed May 31, 1930. Serial No. 458,061.

This invention relates to multiple speed transmissions or selective gear speed reducing systems which provide for various speeds in a driven shaft from a constant speed driving shaft or vice versa.

The objects of the invention are to provide a compact mechanism of the type mentioned which will be adapted for direct coupling to a motor, will be entirely enclosed, the driven or power delivery shaft will be in axial alignment with the driving shaft, the various speed gears may be engaged with the load without shock, noise or stopping the mechanism, the release of each gear will be positively effected, the action will be fool proof, the selection of the speeds may be accomplished by simple operation of a handle which may project from the device at any desired angle, and the proper oiling of the gears and bearings will at all times be assured.

In the drawings accompanying this application, Fig. 1 is central section of my multiple speed transmission showing the aligned driving and driven shafts and the arrangements of gears and clutches within the casing and the view is taken as along the line 1—1 of Fig. 2.

Fig. 2 is an end view of the transmission with a portion of the front cover plate broken away to reveal the mechanism within, and with a portion of the operating handle shown in section.

Fig. 3 is a reduced size cross section taken along the line 3—3 of Fig. 1 showing the intermediate or idler gears of the system.

Fig. 4 is a diagrammatic view of an optional hook-up for the different speed gears.

Before entering a detailed description of my improved multiple speed transmission it may be briefly described as a casing enclosing the ends of the aligned driving and driven shafts and a plurality of engaged gears arranged around the shafts on small shafts, the small shafts arranged in a circle about the main shafts, and each provided with a friction clutch, the friction clutches being operated selectively by means of a rotatable arm operated by a crank from outside of the casing.

The particular features of the invention consist in the arrangement of gears into two "layers" only, their particular mounting, symmetrical arrangement, ability to run in either direction without change of adjustment, relation of the clutches and means of actuation, individual adjustment of the clutches from outside of the casing, positive release of each clutch, adjustability to various positions of the clutch operator, indicator for various speeds, and accessibility of the interior parts. Other features of minor importance will appear in the detailed description to follow.

In the drawings the casing comprises a circular frame portion 1 provided with bolting feet or legs 2, and a circular pan-shaped cover portion 3 secured to the frame portion by cap screws 4 evenly spaced around the margin so that the cover may be secured in place at any desired angle of rotation.

The rear side of the frame portion is provided with a flange 5 for bolting direct to a motor (not shown) if desired, by means of bolts 6. It being understood that this flange will take any required shape or diameter to suit the motor frame to which the transmission is to be connected.

It should also be noted that since the transmission is usually heavier than the motor to which it couples, that the motor need not have supporting feet of its own as the assemblage may be carried wholly upon the feet of the transmission.

Centrally at opposite points on the rear of frame portion 1 and cover portion 3 of the casing are bosses 7, 7' supporting within packing ring and bearings indicated and through which bosses and bearings respectively extend aligned driving 8 and driven 9 shafts. Shaft 8 is usually the shaft of an electric motor, through of course it may be any other power shaft, while shaft 9 is the driven shaft which may be run at various speeds depending on the number and variety of gears used in the system, and this depending merely on the size of the casing. In practice about four changes of speed are found sufficient to meet most requirements.

Within the casing and secured to the end of motor shaft 8 is a driving spur pinion 10 meshing with a large spur gear 11. This large gear 11 is positioned between a pair of supporting rings 12 and 13 which fit within finished shoulders 14 on the casing and are spaced apart by means of bushings 15 on spacer pins 16 held securely in position by suitable means such as the set screws 17.

These spacer pins project slightly into the frame 1 to prevent bodily turning of the rings, and both rings are held in position by margin of cover 3 forced against them.

Gear 11 is one of four different size driven gears each mounted on short clutch shafts 18. In Fig. 1 two only of these gears are shown, 11 and 20, but in Fig. 3 the four are shown under numbers 11, 19, 20 and 21, being respectively, 1st or low speed, 2nd, 3rd, and 4th or highest speed. These gears are geared together by means of spur idler gears 22, 23, 24 also carried between the rings 12 and 13 on pins 25 surrounded with bushings 26. The pins are secured in place by set screws 25'.

The ends of the clutch shafts 18 as here shown have bearing support in ring 12 through means of solid (bronze) bushings 27 pinned to the shafts, but are supported in ring 13 in ball bearings 28, the outer races of which are retained against lateral shifting by means of thin plates 29 on opposite sides of ring 13.

Clutch shafts 18 are slightly enlarged to the right of ring 13 and carry male friction clutch members 30 free to revolve on the shafts but each held against longitudinal movement by inner race of the ball bearing 28 and a shoulder 31, while secured to the hub of each clutch member 30 is a spur gear 32 meshing with a spur gear 33 keyed to shaft 9. The extreme inner end of shaft 9 is supported in a ball bearing 34 mounted in a central bore of ring 13.

Clutch member 30 is in the form of a double cone at its outer end and adapted to engage complementarily formed clutch member 35 slidably mounted or feathered to the outer end of the clutch shaft, so that upon engaging the clutch sections of any one clutch power will be transmitted from its driven gear to shaft 9.

The female member 35 of each clutch is normally urged outward by means of a spiral compression spring 36 seated within a bore in the clutch shaft and bearing at its outer end against a small yoke 37 around a pin 38 extending transversely of the clutch shaft through a slot 39 formed therein, and the pin projecting at its ends slightly into a hole 40 drilled transversely through the female clutch member. This arrangement confines the clutch member upon the end of the clutch shaft but gives it free limited sliding movement for engaging and disengaging clutch member 30.

For applying engaging pressure to each clutch I provide the following construction: A bearing 41 is countersunk into the outer end of each clutch member 35 and arranged with its inner race free of longitudinal obstruction and provided with a central stud or button 42 with an arched head having a slight depression in its outer end as indicated in dotted line, while directly opposite this button and threaded through a hole in the casing cover 3 is a similar stud and button 43. The outer end of the stud is slotted as at 44 to receive a screw driver and is provided with a lock nut 45 to lock it in adjusted position.

This construction is repeated for each clutch and a revolving arm 46 provided with spring steel spreader ends 47 is rotatably mounted on shaft 9 so that its ends may be selectively brought between any pair of buttons to resiliently force them apart. The ends of the spring spreader members 47 are rounded (as best shown in Fig. 2) so that they will wedge in between the rounding buttons 42, 43. Arm 46 has a hub 48 feathered on a bushing 49 loose on shaft 9 and on which bushing is secured a bevel gear 50 and also a clutch releasing disk 51, while surrounding the bushing is a spring 52 resiliently holding the revolvable arm 46 to the right as seen in Fig. 1.

Bevel gear 50 is for the purpose of revolving the bushing 49 and thereby the arms 46—47 to force any pair of buttons apart for engaging a clutch, while disk 51 is provided with tapered jaws 53 adapted when the disk is turned, to wedge under the inner shoulder of clutch members 35 and forcibly release them from clutching engagement with members 30. The jaws 53 precede and follow arm 46—47 so that as soon as the arm is shifted from between a pair of buttons the clutch will be positively released regardless of which direction the arm is revolved.

To swing the arm in its circular path for selectively engaging the clutches I provide a radially extending shaft 54, supported in a bearing boss 55 formed on casing cover 3, and carrying at its inner end a bevel pinion 56 meshing with gear 50 and at its outer end outside of the casing a crank handle 57.

Crank handle 57 is provided with a tubular hub 58 freely slidable over shaft 54 and provided with a transverse slot at its inner end engaging a drive pin 59 projecting from the shaft, while a compression spring 60 reacting against a shoulder in the hub and a retainer plate 61 normally holds the crank engaged with the pin but permits axial disengaging so as to provide for operating the handle at any desired sector of its revolution on any particular gear, or for easy removal of the handle so that the gear speed engaged cannot be tampered with.

This pin 59 is formed at its ends to periodically advance an indexing gear or disk 62 which may be suitably inscribed with indicia showing which gears are engaged.

It will be noted that the entire cover 3 of the casing may be revolved and bolted at any of eight positions to thus bring the operating crank 57 in any desired position.

The various members requiring lubrication are suitably drilled for passage of oil and suspension ring 63 on top of the casing is screwed in place so that it may if desired also function as an oil plug, while at the bottom of the casing is a laterally extending oil pipe 64 provided with a drain plug 65 and a combined level indicator and filling plug 66.

A "breather" hole is provided in plug 63 by drilling transverse and vertical connecting holes 69—70.

A feature which should be mentioned is the provision of a detent for the revolvable clutch arm at the points of neutrality, that is, centrally between each pair of buttons 43 when the clutches are disengaged. To carry out this I simply provide intermediate buttons the same in all respects as 43 on the cover 3 at points midway between the clutch pressure buttons. The studs of these intermediate buttons are designated 44' on Fig. 2 of the drawings.

While I have shown my improved transmission as including spur gear idlers to transmit power between the various clutch shafts, it is evident that a silent or other form of power chain may connect them instead of the idlers, as indicated at 67 in Fig. 4.

As it is desirable in shifting speeds in a device of this kind that one proceed gradually through the different speeds I sometimes provide a stop for the rotating arm so that it can not pass directly from high to lowest speed clutch. Such a stop is indicated in Fig. 1 by the pin 68.

Having thus described my improved multiple speed transmission I may state that I am aware of other attempts to arrange such gears in a circular row for selective engagement but such prior arrangements have for various reasons not met with success and my invention represents important improvements over such earlier devices in the features above particularly described and hereinafter claimed.

I claim:—

1. In a multiple speed gear transmission, a casing, driving and driven shafts extending therefrom, change speed gears within the casing arranged for transmitting power between the shafts, a circular row of axially slidable clutches associated with said gears, and a rotatable device provided with means for resiliently forcing said clutches selectively into engagement.

2. In a multiple speed gear transmission, a casing, driving and driven shafts extending therefrom, change speed gears within the casing arranged for transmitting power between the shafts, a circular row of axially slidable clutches associated with said gears, and a rotatable spring arm arranged to successively bear against said clutches when the arm is revolved for forcing said clutches one at a time into engagement for transmitting power between said shafts.

3. In a multiple speed gear transmission, a casing, driving and driven shafts extending therefrom, change speed gears within the casing arranged for transmitting power between the shafts, a circular row of axially slidable clutches associated with said gears, a rotatable device provided with means for resiliently forcing said clutches selectively into engagement, and means for individually adjusting the working pressure of said clutches.

4. In a multiple speed gear transmission, a casing, driving and driven shafts extending therefrom, change speed gears within the casing arranged for transmitting power between the shafts, a circular row of axially slidable clutches associated with said gears, a rotatable spring arm arranged to successively bear against said clutches when the arm is revolved for forcing said clutches one at a time into engagement for transmitting power between said shafts, and means for separately adjusting the effective pressure of said spring arm on the different clutches.

5. In a multiple speed gear transmission, a casing, driving and driven shafts extending therefrom, change speed gears within the casing arranged for transmitting power between the shafts, a circular row of axially slidable clutches associated with said gears, a rotatable spring arm arranged to successively bear against said clutches when the arm is revolved for forcing said clutches one at a time into engagement for transmitting power between said shafts, and means positioned for operation from without the casing.

6. In a multiple speed transmission, a casing, driving and driven shafts extending therefrom, change speed gears within the casing arranged for transmitting power between said shafts, a circular row of clutches associated with said gears, a rotatable device adapted to swing around said circular row of clutches for selectively engaging the same, an operative handle arranged for operating said device from outside of said casing, and means whereby said handle may be extended from any of several positions around said casing.

7. In a gear transmission of the character described including a casing, a shaft, a clutch gear thereon including an axially movable member for engaging the clutch, and a spring arm reacting between the casing and said member for engaging said clutch.

8. In a gear transmission of the character described including a casing, a shaft, a clutch gear thereon including an axially movable member for engaging the clutch, a spring arm reacting between the casing and said member for engaging said clutch, and means for adjusting the tension of said arm from without the casing.

9. In a gear transmission of the character described including a casing, a shaft, a clutch gear thereon including a slidable clutch member at the end of said shaft, means retaining said member upon said shaft, a spring tending to force said member outward for disengaging said clutch, and means reacting between the outer end of said member and said casing for forcing said clutch member inward for engaging said clutch.

10. In a gear transmission of the character described including a casing, a shaft, a clutch gear thereon including a slidable clutch member at the end of said shaft, means retaining said member upon said shaft, a spring tending to force said member outward for disengaging said clutch, a pressure boss carried by said clutch, a pressure boss carried by said casing, and spring means arranged to be interposed between the bosses for resiliently forcing said bosses apart.

11. In a multiple speed transmission, a circular casing, driving and driven shafts extending therefrom, a plurality of gears within the casing arranged for transmission of power from shaft to shaft, and a pair of spaced rings in said casing supporting said gears whereby said gears may be assembled on said rings and inserted as a unit in said casing, said gears including a circular row of dissimilar size driven gears, a gear on said driving shaft meshing with one of said driven gears, and intermediate idler gears carried by said rings connecting said driven gears.

12. In a multiple speed transmission, a circular casing, driving and driven shafts extending therefrom, a plurality of gears within the casing arranged for transmission of power from shaft to shaft, a pair of spaced rings in said casing supporting said gears whereby said gears may be assembled on said rings and inserted as a unit in said casing, said gears including a circular row of dissimilar size driven gears, a gear on said driving shaft meshing with one of said driven gears, and intermediate idler gears carried by said rings connecting said driven gears, shafts extending through said rings and on which said driven gears are mounted, clutches on said shafts, clutch gears on said clutches, a gear on said driven shaft meshing with said clutch gears, and means for selectively engaging said clutches.

13. In a construction as specified in claim 12, said means for engaging said clutches comprising an arm mounted for rotation around said driven shaft, a gear to which said arm is attached, and an operating shaft extending out of said casing carrying a gear at its inner end meshing with the gear of said arm.

14. In a construction as specified in claim 12, said means for engaging said clutches comprising an arm mounted for rotation around said driven shaft, a gear to which said arm is attached, an operating shaft extending out of said casing carrying a gear at its inner end meshing with the gear of said arm, and an indicator showing the relative position of said arm with respect to said clutches when said operating shaft is turned.

15. In a multiple speed reducer, a housing, axially aligned driving and driven shafts extending from the housing, multiple speed reducing gears within said housing for connecting the shafts together including a spur gear on one of said shafts, a circular row of uniform size spur gears supported around said shaft in mesh with said spur gear, and gear means for imparting various speeds from the other shaft to the gears of said circular row respectively.

WILLIAM ROBERTS.